United States Patent [19]
Wakabayashi et al.

[11] Patent Number: 5,316,640
[45] Date of Patent: May 31, 1994

[54] FABRICATING METHOD OF MICRO LENS

[75] Inventors: Shinichi Wakabayashi; Hitomaro Tougou, both of Kawasaki; Yukio Toyoda, Tokyo; Yoshimasa Ohki, Sagamihara, all of Japan

[73] Assignee: Matsushita Electric Industrial Co., Ltd., Osaka, Japan

[21] Appl. No.: 896,018

[22] Filed: Jun. 9, 1992

[30] Foreign Application Priority Data

Jun. 19, 1991 [JP] Japan ................................. 3-147238
Sep. 5, 1991 [JP] Japan ................................. 3-225714

[51] Int. Cl.$^5$ .......................................... H01L 21/00
[52] U.S. Cl. ............................. 204/192.34; 156/643; 156/652; 156/653; 156/657; 156/659.1; 156/662
[58] Field of Search ............... 156/652, 653, 663, 643, 156/662, 659.1, 661.1; 204/192.34

[56] References Cited

U.S. PATENT DOCUMENTS

| | | | |
|---|---|---|---|
| 4,131,506 | 12/1978 | Namba et al. | 156/662 X |
| 4,321,282 | 3/1982 | Johnson | 204/192.34 X |
| 4,524,127 | 6/1985 | Kane | 156/662 X |
| 4,604,176 | 8/1986 | Paul | 204/192.34 |
| 4,648,939 | 3/1987 | Maa et al. | 156/662 X |
| 4,869,780 | 9/1989 | Yang et al. | 204/192.34 X |
| 5,145,554 | 9/1992 | Seki et al. | 156/643 |

FOREIGN PATENT DOCUMENTS 39646 3/1980 Japan .............................. 204/192.34

OTHER PUBLICATIONS

Dimigen et al, "Influence of Mask Materials on Ion--etched Structures", J. Vac. Sci. Technol., vol. 13, No. 4, 1976, pp. 976–980.

Matsui et al, "Microfabrication of LiNbO$_3$ by Reactive Ion–Beam Etching", Japanese Journal of Applied Physics, vol. 19, No. 8, Aug. 1980, pp. L463–L465.

Primary Examiner—Thi Dang
Attorney, Agent, or Firm—Lowe, Price, LeBlanc & Becker

[57] ABSTRACT

A testing sample is formed in a three-story structure consisting of a photo-resist 13, a silicon dioxide film 12, and a GaAs substrate 11. The pattern of the photo-resist 13 is transferred onto the silicon dioxide film 12 by effecting the photo-resist 13 as a mask. Thus obtained silicon dioxide film mask 14 and the GaAs substrate 11 are processed in compliance with a reactive ion beam etching method; that is, the silicon dioxide film mask 14 and the GaAs substrate 11 are irradiated by the chlorine ion beam 15. The silicon dioxide film and the GaAs substrate are gradually etched by the irradiation of the chlorine ion beam 15. In this case, the etching is differently developed in two regions. In one region which is not covered by the mask, the etching advances uniformly in a normal direction with respect to the GaAs substrate at a certain etching rate. On the other hand, in the other region which is covered by the mask, the silicon dioxide film is gradually etched first of all, and the tapered portion of the silicon dioxide film is completely etched earlier than other portion of the silicon dioxide film. Then, the GaAs surface is exposed to the chlorine ion beam at the portion the silicon dioxide film is removed and, in turn, the GaAs substrate is gradually etched by being directly irradiated by the chlorine beam. And, when the silicon dioxide film mask is completely removed, the micro lens is finally formed on the GaAs substrate.

8 Claims, 6 Drawing Sheets

FABRICATING METHOD OF MICRO LENS

BACKGROUND OF THE INVENTION

1. Field of the Invention:

The present invention relates to a fabricating method for forming a micro lens of compound semiconductor utilized in a field of an optical information processing system or an optical measurement system.

2. Description of the Prior Art:

In an opto-electrical integrated circuit used in an optical information processing system or an optical communication, or an optical measurement etc., it is required to fabricate a substrate integrally with various optical components formed thereon. For example, a semiconductor laser as a light-emitting device and a micro lens are required to be installed together on the same substrate surface in order to minimize optical elements and obtain high performance.

A conventional fabricating method for forming a micro lens on a compound semiconductor substrate is, for example, disclosed in the Applied Physics Letters 55 (2) (1989) pp. 97–99.

FIG. 6 is a schematic view showing a process of such a conventional fabricating method for forming a micro lens on a compound semiconductor substrate. This conventional fabricating method of the micro lens is as follows.

Photolithography and etching method using the bromine:methanol etchants are alternately applied on a GaP substrate 61 by successively increasing size of circular mask 62. With these processes, the GaP substrate 61 is stepwisely etched so as to accumulate a plurality of coaxial steps, constituting a rough outline of a micro lens as shown in FIG. 6(d). Subsequently, thus etched substrate is exposed in an atmosphere of phosphine ($PH_3$) and hydrogen ($H_2$) gases at approximately 1000° C. so that the mass transport can be carried out. During several tens hours to 100 hours, stepped portions of the GaP substrate are gradually smoothened. And finally, as shown in FIG. 6(e), a spherical lens 63 can be formed.

However, above conventional fabricating method of a micro lens is disadvantageous in that photolithography and etching method must be alternately carried out to form coaxial etching steps on the compound semiconductor substrate. Furthermore, it is feared that a high-temperature process required for executing the mass transport may induce a sever property change or a significant deterioration of electronic devices or optical devices fabricated in advance on the substrate.

SUMMARY OF THE INVENTION

The present invention has a purpose, in view of above problems and disadvantages encountered in the conventional art, to provide a fabricating method for forming a micro lens on a compound semiconductor with a good controllability by use of a simple process, without utilizing the high-temperature process.

To accomplish this end, the present invention provides a fabricating method of a micro lens comprising steps of forming a column shaped etching mask of silicon dioxide film on a compound semiconductor substrate by use of a wet etching process, and etching both said compound semiconductor substrate and said etching mask by irradiating sharp particle beam. Furthermore, the etching mask is made of a semi-spherical photo-resist material. Or, the etching mask made of semi-spherical photo-resist material is utilized to form the etching mask of silicon dioxide film.

Furthermore, the present invention provides a fabricating method of a micro lens comprising steps of forming a column shaped etching mask of silicon dioxide film on a compound semiconductor substrate by use of a wet etching process, and etching both said compound semiconductor substrate and said etching mask by irradiating sharp particle beam obliquely with respect to the substrate.

Moreover, a reactive ion beam is used as the sharp particle beam, and an acceleration voltage of the ion beam is varied in order to control the etching condition of the micro lens.

With above arrangement, a first aspect of the present invention realizes an easy fabrication method of a convex micro lens having a single curvature or a complex curvature consisting of a plurality of curvatures. That is, a smooth convex micro lens is easily fabricated by applying irradiation of sharp particle beam only one time on both a compound semiconductor substrate and a column shaped etching mask of silicon dioxide film formed in advance on the compound semiconductor substrate. The reason why the smooth convex micro lens can be obtained in accordance with above etching method is that the silicon dioxide film and the compound semiconductor have mutually different selectivities of etching rate and a tapered edge of the etching mask is formed by a wet etching so as to realize a retreat or reduction effect.

By adjusting etching conditions, it becomes possible to control an etching process so as to obtain a micro lens having a fine fabricated surface. It is also possible to control the etching so as to uniformly fabricate a two-dimensionally disposed micro lens array.

A second aspect of the present invention suggests to use a liquid photo-resist as an etching mask. The liquid photo-resist forms a semi-spherical shape due to its own surface tension, when dropped a small amount on the compound semiconductor substrate. By utilizing this liquid photo-resist as a mask, it becomes possible to obtain a convex micro lens having a spherical surface.

And, if the difference of etching rate between the photo-resist and the compound semiconductor is further utilized, it becomes possible to adequately vary the configuration of convex shape or its curvature. Thus, parameters representative of lens properties such as a focal distance and an NA (i.e. numerical aperture) are easily changed by properly selecting thickness and configuration of the etching mask and etching condition.

A third aspect of the invention uses an etching method that irradiates a sharp particle beam obliquely with respect to the surface of substrate. A smooth convex micro lens having a focal direction being offset from a vertical direction of a substrate is easily fabricated by applying irradiation of the sharp particle beam only one time on both the compound semiconductor substrate and the column shaped etching mask of silicon dioxide film formed in advance on the compound semiconductor substrate. For this method, the difference of etching rate between the silicon dioxide film and the compound semiconductor is utilized, and the tapered edge of the etching mask is formed by a wet etching method so as to realize a retreat or reduction effect.

Furthermore, by adjusting etching conditions, it becomes possible to control an etching process so as to obtain a micro lens having a fine fabricated surface.

A fourth aspect of the present invention suggests the etching method in which the reactive ion beam is utilized as the sharp particle beam. The etching process is carried out by changing the acceleration voltage of the ion beam. The etching rate of the silicon dioxide film and the compound semiconductor and the selection ratio of the etching rate between the silicon dioxide film and the compound semiconductor can be varied by changing the acceleration voltage of the ion beam.

And further, if the difference of the selection ratio of etching rate is utilized, it becomes possible to adequately vary the configuration of convex shape or its curvature. Thus, parameters representative of lens properties such as the focal distance and the NA (i.e. numerical aperture) are easily changed by properly selecting thickness and configuration of the etching mask and etching condition.

The above and other objects, features and advantages of the present invention will become more apparent from the following detailed description which is to be read in conjunction with the accompanying drawings.

DETAIL DESCRIPTION OF THE PREFERRED EMBODIMENTS

Figure 1A:
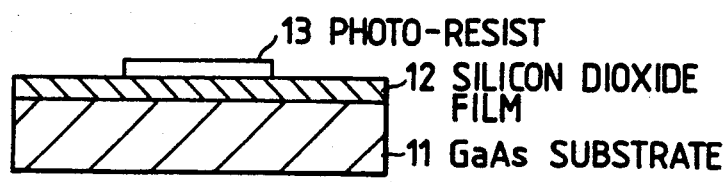
FIGS. 1(a)-1(e) are views showing a fabrication method for forming a micro lens in accordance with a first embodiment of the present invention.

Hereinafter, referring now to the accompanying drawings, embodiments of the present invention are explained in detail.

First Embodiment

FIG. 1 is a view showing a fabrication method for forming a micro lens in accordance with a first embodiment of the present invention. In the drawing, a reference numeral 11 denotes a GaAs substrate to be formed with a micro lens, and a reference numeral 12 denotes a silicon dioxide film formed on the GaAs substrate 11. A reference numeral 13 denotes a column shaped photo-resist pattern which serves as an etching mask, and a reference numeral 14 denotes a column shaped silicon dioxide film pattern serving as an etching mask for the GaAs substrate 11. A reference numeral 15 denotes a chlorine ion beam executing the etching process, and a reference numeral 16 denotes a micro lens obtained after having been processed by this etching method.

Hereinafter, the fabrication method for forming a micro lens in accordance this embodiment is explained in detail with reference to the drawing.

A testing sample is formed in a three-story structure as shown in FIG. 1(a). That is, the photo-resist 13 which is patterned in a column shape having a diameter of 50 $\mu$m and a thickness of 0.5 $\mu$m is laid on the silicon dioxide film 12 having a thickness of 1 $\mu$m. The silicon dioxide film 12 is laid on the GaAs substrate 11.

Figure 1B:
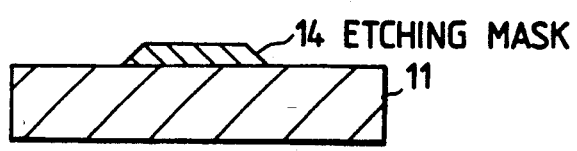

The pattern of photo-resist 13 is transferred onto the silicon dioxide film 12 by effecting the photo-resist 13 as a mask. In this case, if a buffer hydrofluoric acid solution (for example, ammonium fluoride: hydrofluoric acid=9:1) is used as etchants, the etching mask 14 is formed with a peripheral edge having a tapered angle of 40 degrees as shown in FIG. 1(b).

Thus obtained silicon dioxide film mask and the GaAs substrate are processed in compliance with a reactive ion beam etching method; that is, the silicon dioxide film mask and the GaAs substrate are irradiated by the chlorine ion beam 15. As the chlorine ion beam apparatus, an ANELVA ECR-310E can be used.

The etching condition is as follows.

Etching gas: $CL_2$
Gas pressure: $2.5 \times 10^{-3}$ Torr
Ion beam extraction voltage: 400 V
Microwave power: 200 W
Substrate temperature: room temperature
Incident beam angle: 90 degrees (i.e. normal direction with respect to the substrate)

Figure 1C:
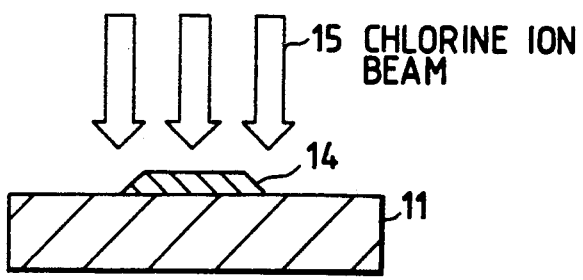

The silicon dioxide film as a mask and the GaAs substrate are gradually etched by irradiating the chlorine ion beam 15 as shown in FIG. 1(c). In this case, the etching is differently developed in two regions. One region is a porion where the GaAs substrate surface is exposed to the chlorine beam 15; in other words, a portion not covered by the mask. In this region, the etching advances uniformly in a normal direction with respect to the GaAs substrate at a certain etching rate.

The other region is a porion where the GaAs substrate surface is not exposed to the chlorine beam 15; in other words, a portion covered by the mask. In this region, the silicon dioxide film is gradually etched. First of all, the tapered portion of the silicon dioxide film is completely etched earlier than other portion of the silicon dioxide film. The GaAs surface comes to be exposed at the portion the silicon dioxide film is removed and, in turn, the. GaAs substrate is gradually etched by being directly irradiated by the chlorine beam.

Figure 1D:
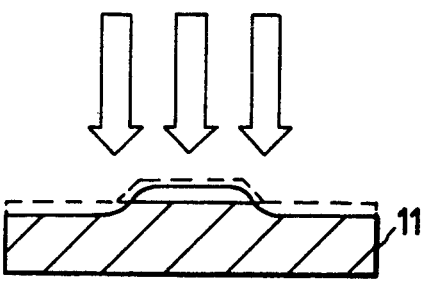

As the etching advances in a region of the tapered edge of the silicon dioxide film mask, a diameter of the silicon dioxide film mask gradually reduces. Namely, the development of etching is accompanied with a retreat or reduction of mask as shown in FIG. 1(d).

Figure 1E:
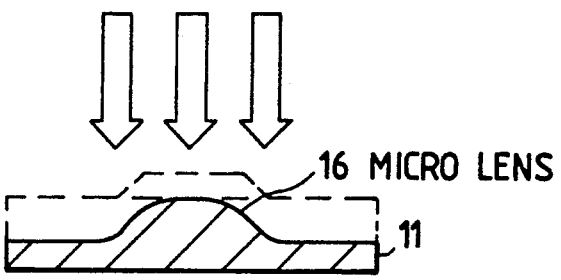

And, when the etching has further developed until the mask of silicon dioxide film is completely removed, the micro lens is finally formed as shown in FIG. 1(e). Thus formed micro lens has a diameter of 50 $\mu$m and a thickness of 3 $\mu$m. This is affected by the etching speed difference between the silicon dioxide film and the GaAs substrate.

As is explained in this first embodiment, in order to form a micro lens on the GaAs substrate, first of all the column shaped silicon dioxide film is formed on the GaAs substrate and, subsequently, thus formed column shaped silicon dioxide film is etched by the reactive ion beam until the micro lens is completely formed. Therefore, it becomes possible to obtain a micro lens having a desired size and a curvature through only one etching process by optimizing a kind and a thickness of the mask and etching condition.

Second Embodiment

FIG. 2 is a view showing a fabrication method for forming a micro lens in accordance with a second embodiment of the present invention. In the drawing, a reference numeral 21 denotes a GaAs substrate to be formed with a micro lens, and a reference numeral 22 denotes a photo-resist serving as an etching mask formed on the GaAs substrate 21. A reference numeral 23 denotes an Ar ion beam executing the etching process, and a reference numeral 24 denotes a micro lens obtained after having been processed by this etching method.

Hereinafter, the fabrication method for forming a micro lens in accordance this embodiment is explained in detail with reference to the drawing.

Figure 2A:
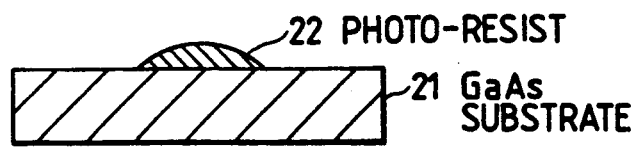
FIGS. 2(a)-2(d) are views showing a fabrication method for forming a micro lens in accordance with a second embodiment of the present invention.

A small amount of the liquid photo-resist is dropped on the GaAs substrate 21. Then the liquid photo-resist forms a semi-spherical shape having a diameter 50 μm and a thickness of 10 μm due to its own surface tension, as shown in FIG. 2(a).

Thus formed photo-resist and the GaAs substrate are processed in compliance with a reactive ion beam etching method; that is, the photo-resist and the GaAs substrate are irradiated by the Ar ion beam 23.

The etching condition is as follows.

Etching gas: Ar
Gas pressure: $2.5 \times 10^{-3}$ Torr
Ion beam extraction voltage: 400 V
Microwave power: 200 W
Substrate temperature: room temperature
Incident beam angle: 90 degrees (i.e. normal direction with respect to the substrate)

Figure 2B:
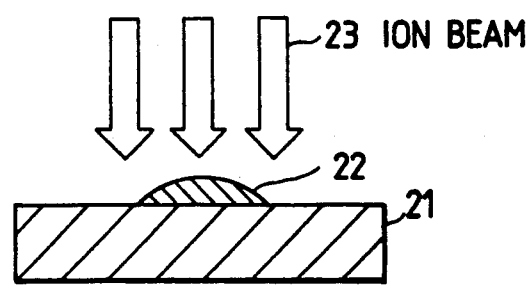

The silicon dioxide film mask and the GaAs substrate are gradually etched by irradiating the Ar ion beam 23 as shown in FIG. 2(b).

Figure 2C:
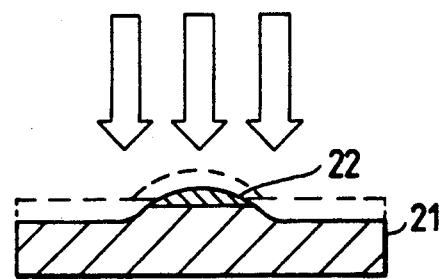
Figure 2D:
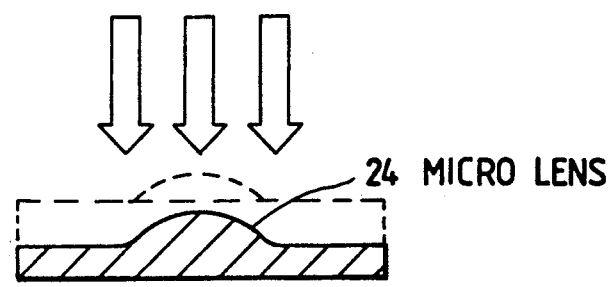

During the photo-resist mask and the GaAs substrate are gradually etched by irradiating the Ar ion beam 23, the ion beam causes the physical spattering. The photo-resist and the GaAs substrate are etched at the same etching rate, and the mask gradually reduces its diameter as shown in FIG. 2(c).

And, when the etching has further developed until the mask of silicon dioxide film is completely removed, the micro lens having the same configuration and curvature as the original photo-resist 22 is finally formed as shown in FIG. 2(e). That is, thus formed micro lens has a size of a diameter of 50 μm and a thickness of 10 μm.

As is explained in this second embodiment, in order to form a micro lens on the GaAs substrate, first of all the photo-resist having a certain curvature is formed as a mask on the GaAs substrate and, subsequently, thus formed mask is etched by the reactive ion beam until the micro lens is completely formed. Therefore, it becomes possible to obtain a micro lens having the same configuration and as the original photo-resist through only one etching process.

Third Embodiment

FIG. 3 is a view showing a fabrication method for forming a micro lens in accordance with a third embodiment of the present invention. In the drawing, a reference numeral 31 denotes a GaAs substrate to be formed with a micro lens, and a reference numeral 32 denotes a silicon dioxide film formed on the GaAs substrate 31. A reference numeral 33 denotes a semi-spherical shape photo-resist serving as an etching mask, and a reference numeral 34 denotes an Ar ion beam executing the etching process. A reference numeral 35 denotes an etching mask for the GaAs substrate 31, and a reference numeral 36 denotes a micro lens obtained after having been processed by this etching method.

Hereinafter, the fabrication method for forming a micro lens in accordance this embodiment is explained in detail with reference to the drawing.

Figure 3A:
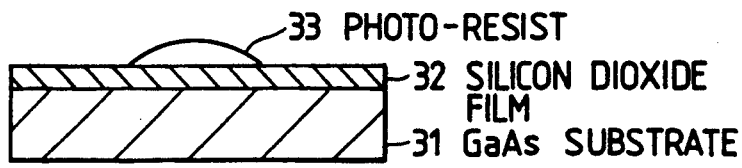
FIGS. 3(a)-3(e) are views showing a fabrication method for forming a micro lens in accordance with a third embodiment of the present invention.

A small amount of the liquid photo-resist 33 is dropped on the silicon dioxide film 32 formed on the GaAs substrate 31. Then the liquid photo-resist 33 forms a semi-spherical shape having a diameter 50 μm and a thickness of 10 μm due to its own surface tension, as shown in FIG. 3(a).

As a first step of etching process, first of all the pattern of the photo-resist 33 is transferred onto the silicon dioxide film 32. The testing sample is processed in compliance with the reactive ion beam etching method; that is, the testing sample is irradiated by the Ar ion beam 34.

The etching condition is as follows.

Etching gas: Ar
Gas pressure: $2.5 \times 10^{-3}$ Torr
Ion beam extraction voltage: 400 V
Microwave power: 200 W
Substrate temperature: room temperature
Incident beam angle: 90 degrees (i.e. normal direction with respect to the substrate)

Figure 3B:
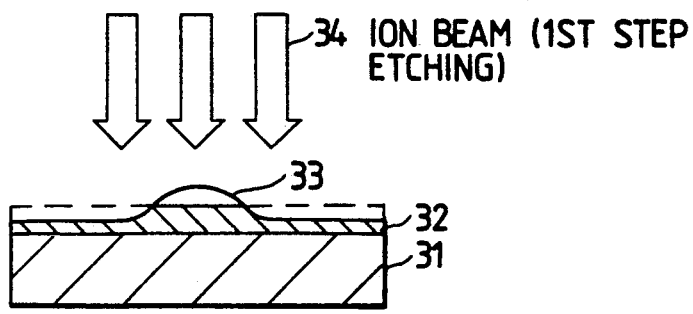

The silicon dioxide film mask and the GaAs substrate are gradually etched by irradiating the Ar ion beam 34 as shown in FIG. 3(b).

Figure 3C:

During the photo-resist 33 and the silicon dioxide film 32 are gradually etched by irradiating the Ar ion beam 34, the ion beam causes the physical spattering. The photo-resist and the silicon dioxide film are etched at the same etching rate, and the mask gradually reduces its diameter as shown in FIG. 3(c).

Figure 3D:
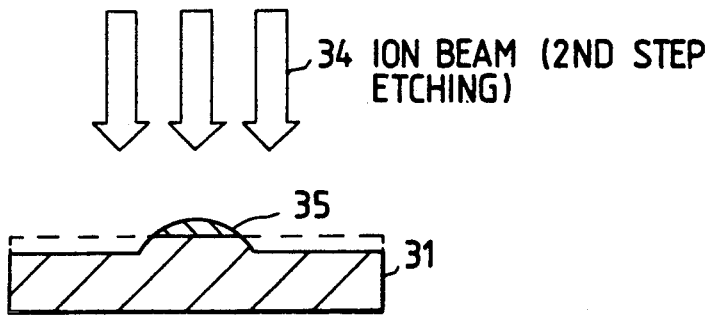

And, when the etching has further developed until the mask of silicon dioxide film is completely removed, the micro lens having the same configuration and curvature as the original photo-resist 33 is formed as shown in FIG. 3(d). That is, thus formed etching mask 35 made of a silicon dioxide film is formed to have a size of a diameter of 50 μm and a thickness of 10 μm.

Next, as a second step of etching process, the etching pattern made of the silicon dioxide film is transferred onto the GaAs substrate 31. The etching mask 35 and the GaAs substrate 31 are gradually etched by irradiating the Ar ion beam 34. The etching condition is the same as previous condition.

Figure 3E:
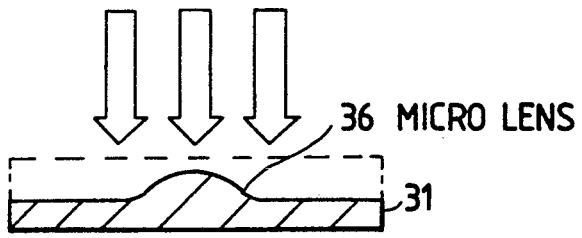

The ion beam causes the physical spattering. The silicon dioxide film and the GaAs substrate are etched at the same etching rate, and the mask gradually reduces its diameter. When the etching has advanced until the mask of silicon dioxide is completely removed, the micro lens having the same configuration and curvature as the etching mask 35 is finally formed as shown in FIG. 3(e). That is, thus formed micro lens 36 has the same configuration and the curvature as the original photo-resist 33. That is, the micro lens 36 has a size of a diameter of approximately 50 μm and a thickness of approximately 10 μm.

As is explained in this third embodiment, in order to form a micro lens on the GaAs substrate, first of all the photo-resist mask having a certain curvature is formed on the silicon dioxide film which formed in advance on the GaAs substrate. This photo-resist mask is etched by the ion beam so as to transfer the photo-resist pattern onto the silicon dioxide film.

Subsequently, the photo-resist pattern is further transferred onto the GaAs substrate to finally form the micro lens having the same configuration as the original photo-resist mask.

Therefore, it becomes possible to prevent the photo-resist and the GaAs substrate from directly contacting with each other by inserting a process for transferring the photo-resist pattern onto the silicon dioxide film.

It is said in general that, when the ion beam is irradiated onto the photo-resist, the photo-resist varies its property to make it difficult to peel off the photo-resist from the substrate and, thus, it is usually required to additionally provide a peeling-off step using, for example, an oxygen plasma.

However, in accordance with the this third embodiment, the photo-resist does not contact with the GaAs substrate. That is, the surface of semiconductor substrate is not damaged during a peeling off step of the photo-resist. Therefore, it becomes possible to easily fabricate the micro lens having a clean surface.

Furthermore, by optimizing the etching condition, and continuously developing the etching, it becomes possible to form the micro lens through a single etching process.

Fourth Embodiment

FIG. 4 is a view showing a fabrication method for forming a micro lens in accordance with a fourth embodiment of the present invention. In the drawing, a reference numeral 41 denotes a GaAs substrate to be formed with a micro lens, and a reference numeral 42 denotes a column shaped silicon dioxide film pattern serving as an etching mask for the GaAs substrate 41. A reference numeral 43 denotes a chlorine ion beam executing the etching process which is irradiated obliquely with respect to the substrate surface, and a reference numeral 44 denotes a micro lens obtained after having been processed by the etching method.

Hereinafter, the fabrication method for forming a micro lens in accordance this embodiment is explained in detail with reference to the drawing.

Figure 4A:
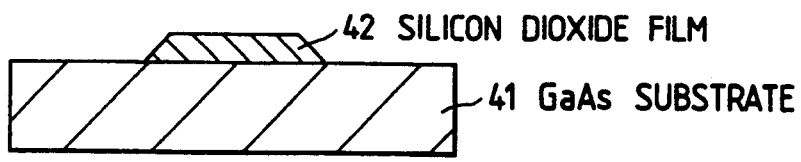
FIGS. 4(a)-4(d) are views showing a fabrication method for forming a micro lens in accordance with a fourth embodiment of the present invention.
Figure 4B:
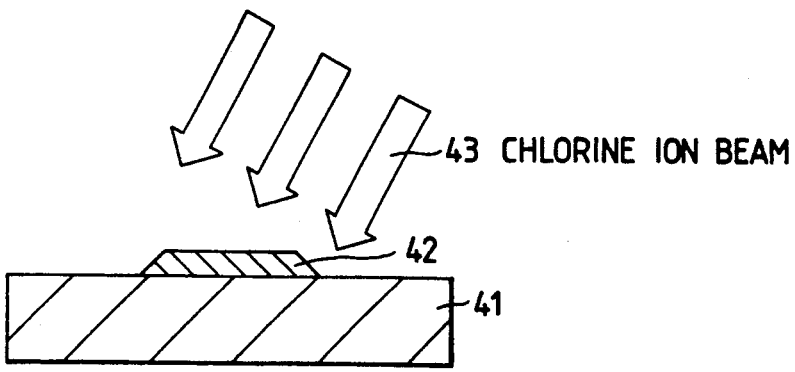

A testing sample is formed in a two-story structure as shown in FIG. 4(a). That is, the silicon dioxide film 42 patterned in a circular shape having a diameter of 50 μm and a thickness of 1 μm is laid on the GaAs substrate 41.

In the case where the pattern of the silicon dioxide film 42 is formed as a mask, if a buffer hydrofluoric acid solution (for example, ammonium fluoride: hydrofluoric acid=9:1) is used as etchants, the etching mask 42 is formed to have a tapered edge as shown in FIG. 4(a).

Thus obtained silicon dioxide film mask and the GaAs substrate are processed in compliance with a reactive ion beam etching method; that is, the silicon dioxide film mask and the GaAs substrate are irradiated by the chlorine ion beam 43.

Figure 4C:
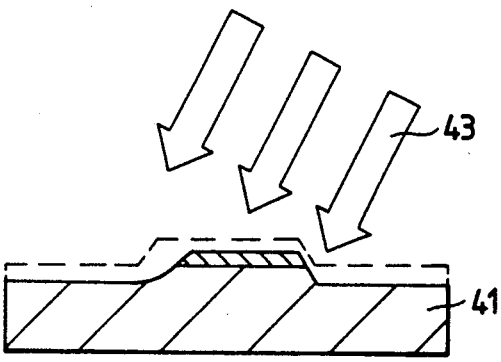

The etching condition is as follows.
Etching gas: $CL_2$
Gas pressure: $2.5 \times 10^{-3}$ Torr
Ion beam extraction voltage: 400 V
Microwave power: 200 W
Substrate temperature: room temperature
Incident beam angle: Not normal to the substrate The silicon dioxide film mask and the GaAs substrate are gradually etched by irradiating the chlorine ion beam 43 as shown in FIG. 4(c). In this case, the etching is differently developed in two regions. One region is a porion where the GaAs substrate surface is exposed to the chlorine ion beam 43; in other words, a portion not covered by the mask. In this region, the etching advances uniformly in a normal direction with respect to the GaAs substrate at a certain etching rate.

The other region is a porion where the GaAs substrate surface is not exposed to the chlorine ion beam 43; in other words, a portion covered by the mask. In this region, the silicon dioxide film is gradually etched. First of all, the tapered portion of the silicon dioxide film is completely etched earlier than other portion of the silicon dioxide film. The GaAs surface is exposed at the portion the silicon dioxide film is removed and, in turn, the GaAs substrate is gradually etched by being directly irradiated by the chlorine ion beam.

As the etching advances in a region of the tapered edge of the silicon dioxide film mask, a diameter of the silicon dioxide film mask gradually reduces. Namely, the development of etching is accompanied with a retreat or reduction of mask. Furthermore, by obliquely irradiating the ion beam, the etched cross sections can be differentiated between the right and left regions. As shown in FIG. 4(c), the left side has a small angle slope and, to the contrary, the right side has a large angle slope.

Figure 4D:
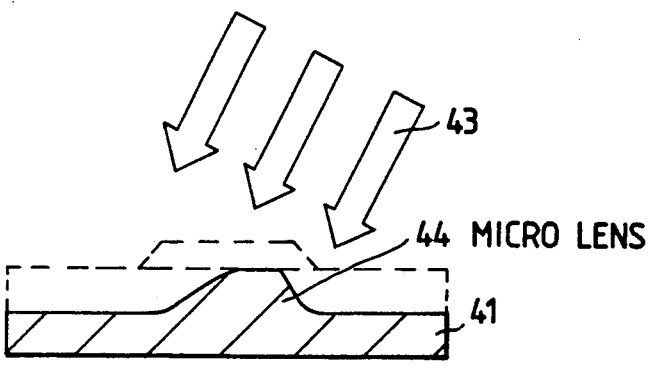

And, when the etching has further advanced until the mask of silicon dioxide film is completely removed, the micro lens is finally formed. Thus formed micro lens has non-symmetrical configuration; i.e. its focal point is offset toward a right direction, as shown in FIG. 4(d).

As is explained in this fourth embodiment, in order to form a micro lens on the GaAs substrate, first of all the column shaped silicon dioxide film is formed on the GaAs substrate and, subsequently, thus formed column shaped silicon dioxide film is etched by the reactive ion beam until the micro lens 44 having a diameter of approximately 50 μm and a thickness of approximately 10 μm is formed. Therefore, it becomes possible to obtain a micro lens having a desired curvature, a desired focal distance, and a desired focal point through only one etching process by optimizing a kind and a thickness of the mask and etching condition.

FIFTH EMBODIMENT

FIG. 5 is a view showing a fabrication method for forming a micro lens in accordance with a fifth embodiment of the present invention. In the drawing, a reference numeral 51 denotes a GaAs substrate to be formed with a micro lens, and a reference numeral 52 denotes a silicon dioxide film serving as an etching mask formed on the GaAs substrate 51. A reference numeral 53 denotes a chlorine ion beam A executing the etching process, and a reference numeral 54 denotes a chlorine ion beam B executing the etching process. A reference numeral 55 denotes a micro lens obtained after having been processed by this etching method.

Hereinafter, the fabrication method for forming a micro lens in accordance this embodiment is explained in detail with reference to the drawing.

Figure 5A:
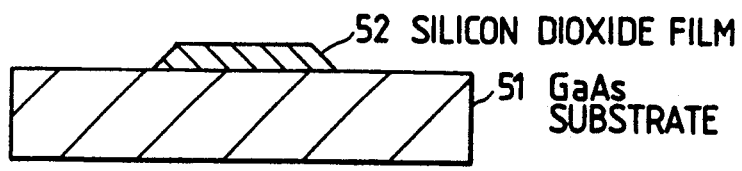
FIGS. 5(a)-5(d) are views showing a fabrication method for forming a micro lens in accordance with a fifth embodiment of the present invention.
Figure 5B:
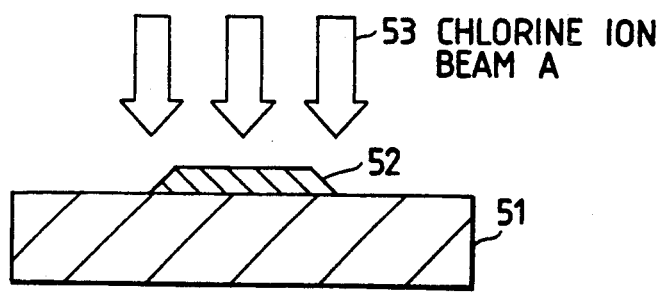

A testing sample is formed in a two-story structure as shown in FIG. 5(a). That is, the silicon dioxide film 52 patterned in a circular shape having a diameter of 50 μm and a thickness of 1 μm is laid on the GaAs substrate 51.

In the case where the pattern of the silicon dioxide film 52 is formed as a mask, if a buffer hydrofluoric acid solution (for example, ammonium fluoride:hydrofluoric acid=9:1) is used as etchants, the etching mask 52 is formed to have a tapered edge as shown in FIG. 5(a).

Thus obtained silicon dioxide film mask and the GaAs substrate are processed in compliance with a reactive ion beam etching method; that is, the silicon dioxide film mask and the GaAs substrate are irradiated by the chlorine ion beam A 53.

This first etching condition is as follows.

Etching gas: CL$_2$
Gas pressure: $2.5 \times 10^{-3}$ Torr
Ion beam extraction voltage: 30 V
Microwave power: 200 W
Substrate temperature: room temperature
Incident beam angle: 90 degrees (normal direction with respect to the substrate)

The ion beam extraction voltage is set lower in this case. Accordingly the silicon dioxide film mask 52 is prevented from being etched, and therefore only the etching of the GaAs substrate 51 is developed this time.

Figure 5C:
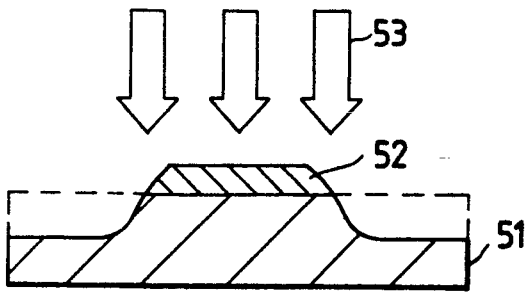

The etching is carried out for a while in such a manner that the GaAs substrate 51 is etched by the chlorine ion beam A 53 while the silicon dioxide film mask 52 is prevented from being etched. This first etching condition is ended at the timing when the etching amount of the GaAs substrate 51 reached an approximately 10 μm as shown in FIG. 5(c).

Figure 5D:
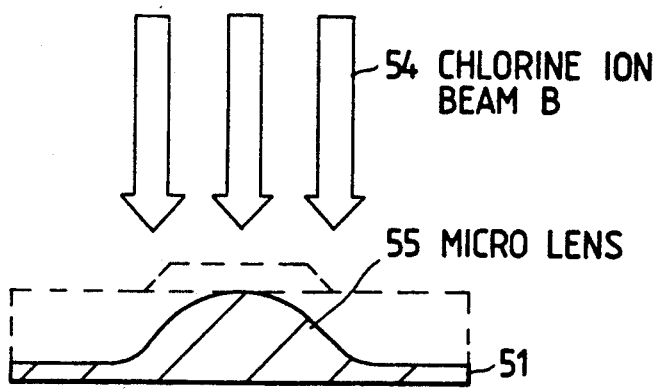
Figure 6A:
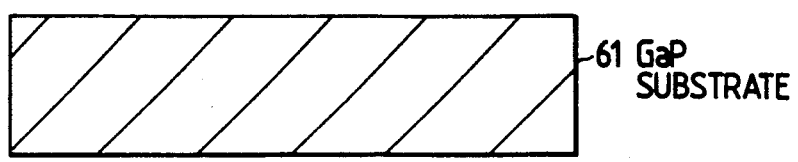
FIGS. 6(a)-6(e) are views showing a conventional fabrication method process for forming a micro lens on a compound semiconductor substrate.
Figure 6B:
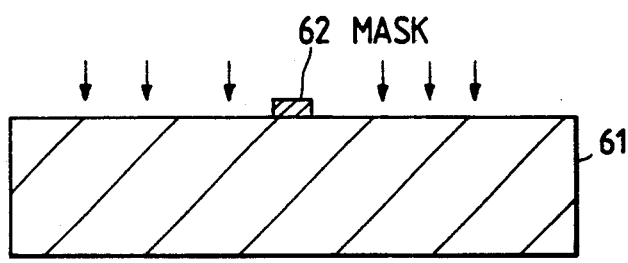
Figure 6C:
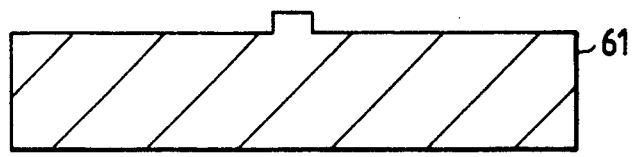
Figure 6D:
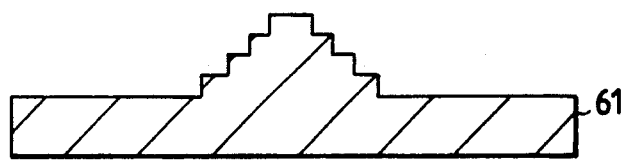
Figure 6E:

Next, the extraction voltage of the ion beam is increased up to 400 V. Under this condition, the silicon dioxide film mask and the GaAs substrate are etched together by the chlorine beam B 54. The mask gradually reduces its diameter. When the silicon dioxide film mask is completely removed, the micro lens 55 having a diameter of approximately 50 μm and a thickness of approximately 20 μm is finally formed as shown in FIG. 5(d).

As is explained in this fifth embodiment, in order to form a micro lens on the GaAs substrate, it becomes possible to change the lens parameters such as a thickness, a curvature, a focal distance and so on are varied by adequately controlling the extraction voltages of two kinds of ion beams. Therefore, it becomes possible to obtain a micro lens having desired parameters through only one etching process. Furthermore, it is also possible to fabricate the micro lens by continuously changing the extraction voltage.

By the way, though the compound semiconductor substrate 11, 21, 31, 41, and 51 are explained as being made of the GaAs substrate, it is needless to mention that other compound semiconductors such as InP etc. can be used. Furthermore, it is also needless to mention that a plurality of micro lenses can be formed on the substrate surface in a two-dimensional array shape, though the above embodiments explained such that only one micro lens is formed on the substrate.

As is explained in the foregoing description, in accordance with the present invention, it becomes possible to provides a fabricating method capable of easily forming a micro lens on a compound semiconductor with a good controllability by use of a simple process, without using a high-temperature processing. Thus, the present invention brings a large effect in a practical aspect.

At this invention may be embodied in several forms without departing from the spirit of essential characteristics thereof, the present embodiments are therefore illustrative and not restrictive, since the scope of the invention is defined by the appending claims rather than by the description preceding them, and all changes that fall within meets and bounds of the claims, or equivalence of such meets and bounds are therefore intended to embraced by the claims.

What is claimed is:

1. A fabricating method of a micro lens comprising:
   a step of forming a first film on a compound semiconductor substrate, said first film having a slower etching rate than that of said compound semiconductor substrate;
   a first etching step of forming an etching mask having a tapered surface at the peripheral edge thereof by etching said first film until a vertical cross section of said first film is changed into a substantially trapezoidal shape; and
   a second etching step of etching both said compound semiconductor substrate and said etching mask by exposing said compound semiconductor substrate and said etching mask to a particle beam irradiation which is substantially normal to surfaces of said compound semiconductor substrate and said etching mask until said etching mask is completely removed by said particle beam, thereby causing said second etching step to progress at different rates for each of said compound semiconductor substrate and said etching mask in such a manner so that said etching mask is etched slowly while said compound semiconductor substrate is etched faster due to the difference in their respective etching rates, resulting in the formation of a semi-spherical micro lens on a surface of said compound semiconductor substrate.

2. A fabricating method of a micro lens in accordance with claim 1 in which a silicon dioxide film is used as said first film.

3. A fabricating method of a micro lens in accordance with claim 1 in which said first etching step is carried out by use of a wet etchant.

4. A fabricating method of a micro lens in accordance with claim 1 in which said first and second etching steps are carried out by use of chlorine ion beams.

5. A fabricating method of a micro lens in accordance with claim 4 in which said ion beam used in said second etching step has a larger energy than the ion beam used in said first etching step.

6. A fabricating method of a micro lens comprising:
   a step of forming a semi-spherical etching mask on a compound semiconductor substrate by dropping a liquid photoresist on a surface of said compound semiconductor substrate; and
   a step of etching both said etching mask and said compound semiconductor substrate by exposing said etching mask and said compound semiconductor substrate to a particle beam irradiation which is substantially normal to surfaces of said etching mask and said compound semiconductor substrate until said etching mask is completely removed by said particle beam, so as to form a semi-spherical micro lens on a surface of said compound semiconductor substrate.

7. A fabricating method of a micro lens comprising:
   a step of forming a first film on a compound semiconductor substrate;
   a step of forming a semi-spherical etching mask on said first film formed on said compound semiconductor substrate by dropping a liquid photo-resist on a surface of said first film formed on said compound semiconductor substrate;
   a first etching step of etching both said etching mask and said first film formed on the compound semiconductor substrate by exposing said etching mask and said first film to a particle beam irradiation which is substantially normal to surfaces of said etching mask and said first film until said etching mask is completely removed; and a second etching step of etching both said first film formed on said compound semiconductor substrate and said compound semiconductor substrate by exposing said first film and said compound semiconductor substrate to said particle beam which is substantially normal to surfaces of said first film and said compound semiconductor substrate until said first film is completely removed by said particle beam, thereby forming a semi-spherical micro lens on a surface of said compound semiconductor substrate.

8. A fabricating method of a micro lens comprising:

a step of forming an etching mask on a compound semiconductor substrate, said etching mask having a tapered surface formed at a peripheral edge thereof;

a step of etching both said compound semiconductor substrate and said etching mask by exposing said compound semiconductor substrate and said etching mask to a particle beam irradiation which is substantially normal to surfaces of said compound semiconductor substrate and said etching mask until said etching mask is completely removed by said particle beam; and a step of varying an acceleration voltage of said particle beam in said etching step, thereby causing said etching step to proceed in such a manner so that said compound semiconductor is etched before said etching mask is etched, resulting in the formation of a semi-spherical micro lens on a surface of said compound semiconductor substrate.

* * * * *